(12) United States Patent
Wiacek et al.

(10) Patent No.: US 6,227,624 B1
(45) Date of Patent: May 8, 2001

(54) VEHICLE WHEEL HUB AND BEARING RETENTION SYSTEM AND METHOD FOR PRODUCING SAME

(75) Inventors: Michael F. Wiacek, Dearborn; Gary L. Koch, Plymouth, both of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/608,319

(22) Filed: Jun. 30, 2000

Related U.S. Application Data

(63) Continuation of application No. 09/328,094, filed on Jun. 8, 1999, now Pat. No. 6,089,673, and a continuation of application No. PCT/US97/22590, filed on Dec. 10, 1997.
(60) Provisional application No. 60/033,453, filed on Dec. 10, 1996.

(51) Int. Cl.[7] .................................................... B60B 27/02
(52) U.S. Cl. ................... 301/105.1; 384/537; 29/898.09
(58) Field of Search ............................. 301/105.1, 124.1; 384/517, 537, 544; 29/898.09; 411/271, 325

(56) References Cited

U.S. PATENT DOCUMENTS

| 114,474 | * | 5/1871 | Randolph | 411/325 |
|---|---|---|---|---|
| 1,052,679 | * | 2/1913 | MacDonald | 411/325 |
| 1,188,611 | * | 6/1916 | Berry | 411/271 X |
| 5,174,839 | * | 12/1992 | Schultz et al. | 301/105.1 X |
| 5,328,275 | * | 7/1994 | Winn et al. | 384/472 |
| 5,353,890 | * | 10/1994 | Clohessy | 180/247 |
| 5,443,316 | * | 8/1995 | Deane et al. | 384/537 X |
| 5,490,732 | * | 2/1996 | Hofmann et al. | 384/537 |
| 5,560,687 | * | 10/1996 | Hagelthorn | 301/105.1 |
| 5,727,886 | * | 3/1998 | Hata et al. | 384/544 X |
| 5,782,565 | * | 7/1998 | Bertetti et al. | 384/537 |

FOREIGN PATENT DOCUMENTS

736398 * 10/1996 (EP) .

\* cited by examiner

Primary Examiner—Russell D. Stormer
(74) Attorney, Agent, or Firm—MacMillan, Sobanski & Todd, LLC

(57) ABSTRACT

This invention relates to an improved vehicle wheel hub and bearing retention system and method for producing the same, the vehicle wheel hub and bearing retention system including a wheel hub, a bearing unit, and a bearing retention and preload device. The wheel hub includes an inboard end, an outboard end, and a main body. The bearing unit is provided onto a bearing seat of the wheel hub. The material of the inboard end of the wheel hub is re-shaped against the bearing retention and preload device to thereby secure the device on the wheel hub and prevent axial and radial movement of said device relative to the wheel hub. The method for producing a vehicle wheel hub and bearing retention system comprising the steps of: (a) providing a wheel hub defining a longitudinal axis and including an inboard end, an outboard end, and a main body, the wheel hub defining a bearing seat and a wheel hub shoulder; (b) providing a bearing unit onto the bearing seat of the wheel hub adjacent the wheel hub shoulder; (c) providing a bearing unit retention and preload device on the opened inboard end of the wheel hub adjacent the bearing unit; and (d) re-shaping the material of the inboard end of the wheel hub against the bearing unit retention and preload device to thereby secure the bearing unit retention and preload device on the wheel hub and prevent axial movement of the bearing unit relative to the wheel hub.

17 Claims, 6 Drawing Sheets

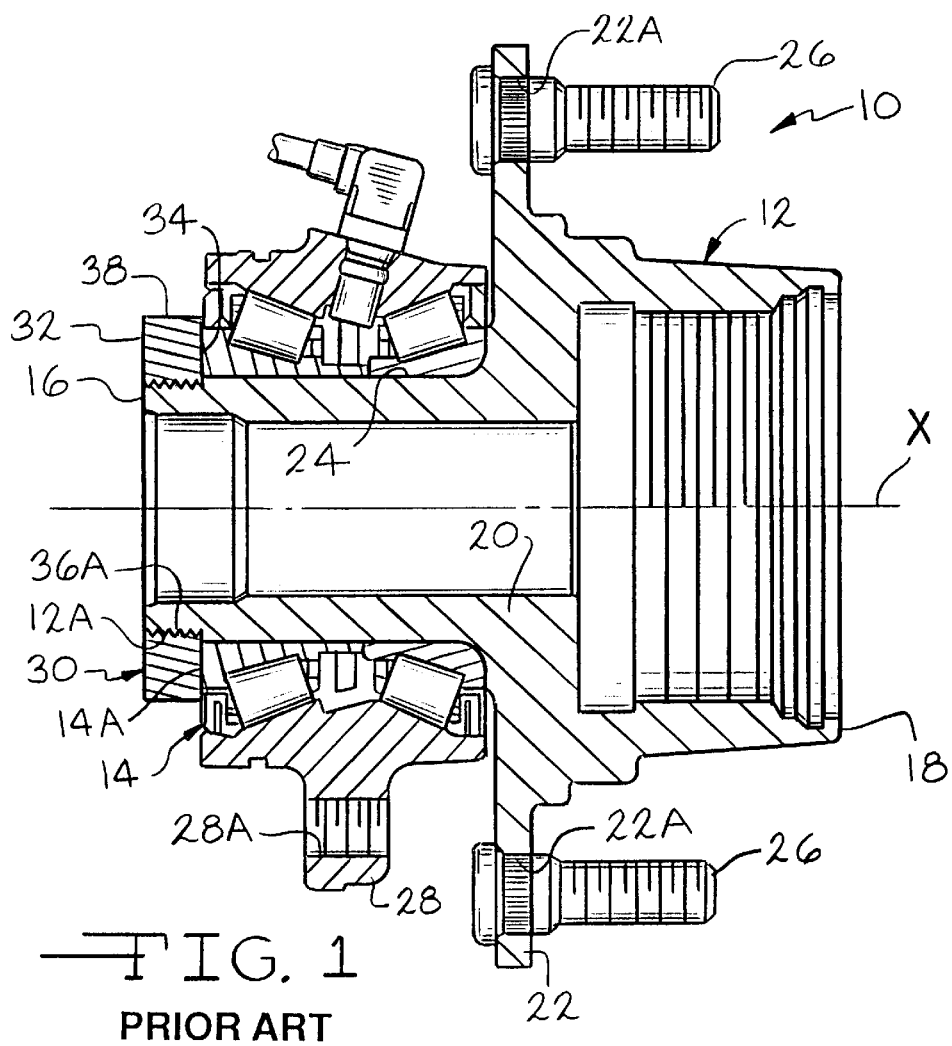
FIG. 1
PRIOR ART
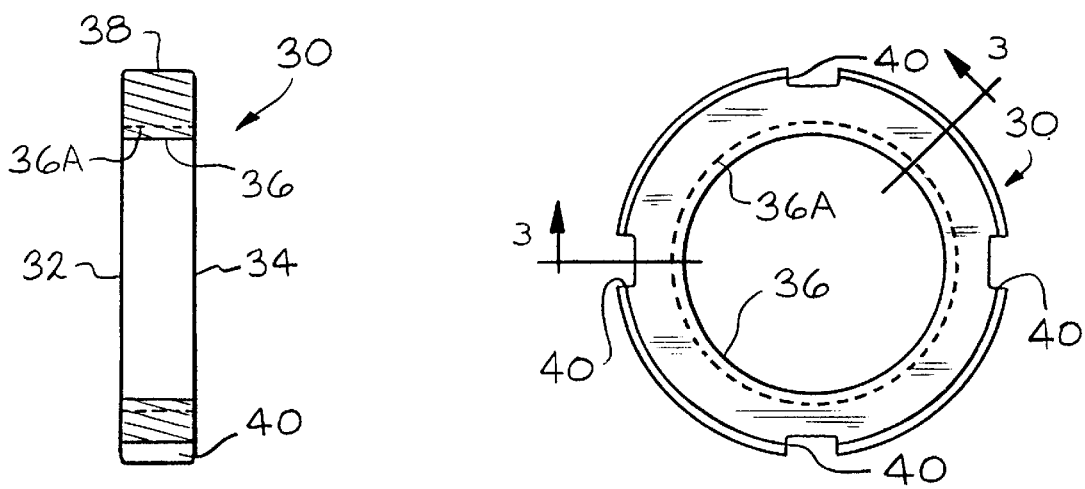
FIG. 3
PRIOR ART
FIG. 2
PRIOR ART

VEHICLE WHEEL HUB AND BEARING RETENTION SYSTEM AND METHOD FOR PRODUCING SAME

CROSS-REFERENCE TO RELATED APPLICATIONS

This application is a continuation of Ser. No. 09 328,094 filing date Jun. 8, 1999 now U.S. Pat. No. 6,089,673.

This application is a continuation of PCT/US97/22590, filed Dec. 10, 1997, which claims the benefit of U.S. Provisional Application Ser. No. 60/033,453, filed Dec. 10, 1996.

BACKGROUND OF THE INVENTION

This invention relates in general to vehicle wheel hub and bearing retention systems and in particular to an improved structure for such a vehicle wheel hub and bearing retention system and method for producing the same.

One example of a known vehicle wheel hub and bearing retention system, indicated generally at 10, is illustrated in prior art FIG. 1. As shown therein, the prior art vehicle wheel hub and bearing retention system 10 is associated with a wheel (not shown) of a vehicle and includes a wheel hub 12 and a bearing unit 14. The wheel hub 12 defines a longitudinal axis X and includes a generally stepped body having an opened inboard end 16, an opened outboard end 18, and a generally axially extending main body 20 having a radially outwardly extending flange 22. The wheel hub 12 is provided with a bearing seat 24 for receiving the bearing unit 14.

The flange 22 of the wheel hub 12 has a plurality of circumferentially spaced lug bolt receiving holes 22A formed therein (only two of such lug bolt receiving holes 22A are illustrated in FIG. 1). A lug bolt 26 is disposed in each of the lug bolt receiving holes 22A to secure a brake rotor (not shown) and the vehicle wheel to the wheel hub 12 for rotation therewith. The outboard end 18 of the wheel hub 12 is adapted to receive a dust cover (not shown) to prevent dirt, mud, water, and other debris from entering into the interior of the wheel hub 12 through the opened outboard end 18.

The illustrated bearing unit 14 is a pregreased, sealed-for life, one-piece cartridge style bearing pack assembly and includes an outwardly extending flange 28. The flange 28 has a plurality of circumferentially spaced mounting bolt receiving holes 28A formed therein (only one of such mounting bolt receiving holes 28A is illustrated in FIG. 1). A mounting bolt (not shown) is disposed in each of the mounting bolt receiving holes 28A to secure the bearing unit 14 to a non-rotatable component of the vehicle, such as the steering knuckle (not shown), so as to rotatably support the wheel hub 12 relative thereto.

A spanner nut 30 is installed on the wheel hub 12 adjacent the opened inboard end 16 thereof to secure the bearing unit 14 on the wheel hub 12 and to preload the bearing unit 14. As shown in prior art FIG. 3, the spanner nut 30 is a generally annular shaped nut and includes an inner end wall 32, an outer end wall 34, an inner cylindrical side wall 36, and an outer cylindrical side wall 38. The outer end wall 34 of the spanner nut 30 defines an engagement surface which is oriented generally perpendicular to the longitudinal axis X of wheel hub 12. The engagement surface 34 is adapted to engage an inboard end surface 14A of the bearing unit 14 when the spanner nut 30 is installed and tightened on the wheel hub 12, as will be described below. The spanner nut 30 is preferably formed from stainless steel or carbon steel, and may be electroplated with zinc for corrosion protection. However, the spanner nut 30 can be formed from other materials, such as for example, aluminum.

As best shown in prior art FIG. 2, the spanner nut 30 is further provided a plurality of slots 40 (four slots 40 being illustrated in prior art FIG. 2) formed in the outer cylindrical side wall 38. The slots 40 extend from the inner end wall 32 to the outer end wall 34 of the spanner nut 30 and are adapted to allow a conventional tool (not shown) to be used to tighten the spanner nut 30 on the wheel hub 12. To accomplish this, the inner cylindrical side wall 36 of the spanner nut 30 is provided with internal threads 36A. The internal threads 36A of the spanner nut 30 mate with external threads 12A provided on the wheel hub 12 adjacent the inboard end 16 thereof As is known, the spanner nut 30 is tightened against the inboard end surface 14A of the bearing unit 14 to a predetermined torque in order to exert a predetermined clamp load on the bearing unit 14.

The prior art vehicle wheel hub and bearing retention system 10 is subjected to various loads during vehicle operation. Typically, the loads which the prior art vehicle wheel hub and bearing retention system 10 are subjected to include radial loads, bending loads, and torsional loads. Depending on the magnitude of the associated loads and the rotational motion of the associated wheel hub 12 during vehicle operation, the spanner nut 30 can rotate and loosen from its installed position resulting in the loss of the preset bearing preload. Thus, it would be desirable to provide an improved structure for a vehicle wheel hub and bearing retention system which improves the retention of the bearing unit on the wheel hub in order to maintain a preset bearing preload and yet is simple and inexpensive.

SUMMARY OF THE INVENTION

This invention relates to an improved vehicle wheel hub and bearing retention system and method for producing the same, the vehicle wheel hub and bearing retention system including a wheel hub, a bearing unit, and a bearing retention and preload device. The wheel hub includes an inboard end, an outboard end, and a main body. The bearing unit is provided onto a bearing seat of the wheel hub. The material of the inboard end of the wheel hub is re-shaped against the bearing retention and preload device to thereby secure the device on the wheel hub and prevent axial and radial movement of said device relative to the wheel hub. The method for producing a vehicle wheel hub and bearing retention system comprising the steps of: (a) providing a wheel hub defining a longitudinal axis and including an inboard end, an outboard end, and a main body, the wheel hub defining a bearing seat and a wheel hub shoulder; (b) providing a bearing unit onto the bearing seat of the wheel hub adjacent the wheel hub shoulder; (c) providing a bearing unit retention and preload device on the opened inboard end of the wheel hub adjacent the bearing unit; and (d) re-shaping the material of the inboard end of the wheel hub against the bearing unit retention and preload device to thereby secure the bearing unit retention and preload device on the wheel hub and prevent axial movement of the bearing unit relative to the wheel hub.

Various objects and advantages of this invention will become apparent to those skilled in the art from the following detailed description of the preferred embodiments, when read in light of the accompanying drawings.

BRIEF DESCRIPTION OF THE DRAWINGS

FIG. 1 is a sectional view of a portion of a prior art vehicle wheel hub and bearing retention system.

FIG. 2 is an elevational view of a prior art spanner nut used on the prior art vehicle wheel hub and bearing retention system of FIG. 1.

FIG. 3 is a sectional view of the prior art spanner nut taken along line 3—3 of FIG. 2.

DETAILED DESCRIPTION OF THE PREFERRED EMBODIMENT

Figure 4:
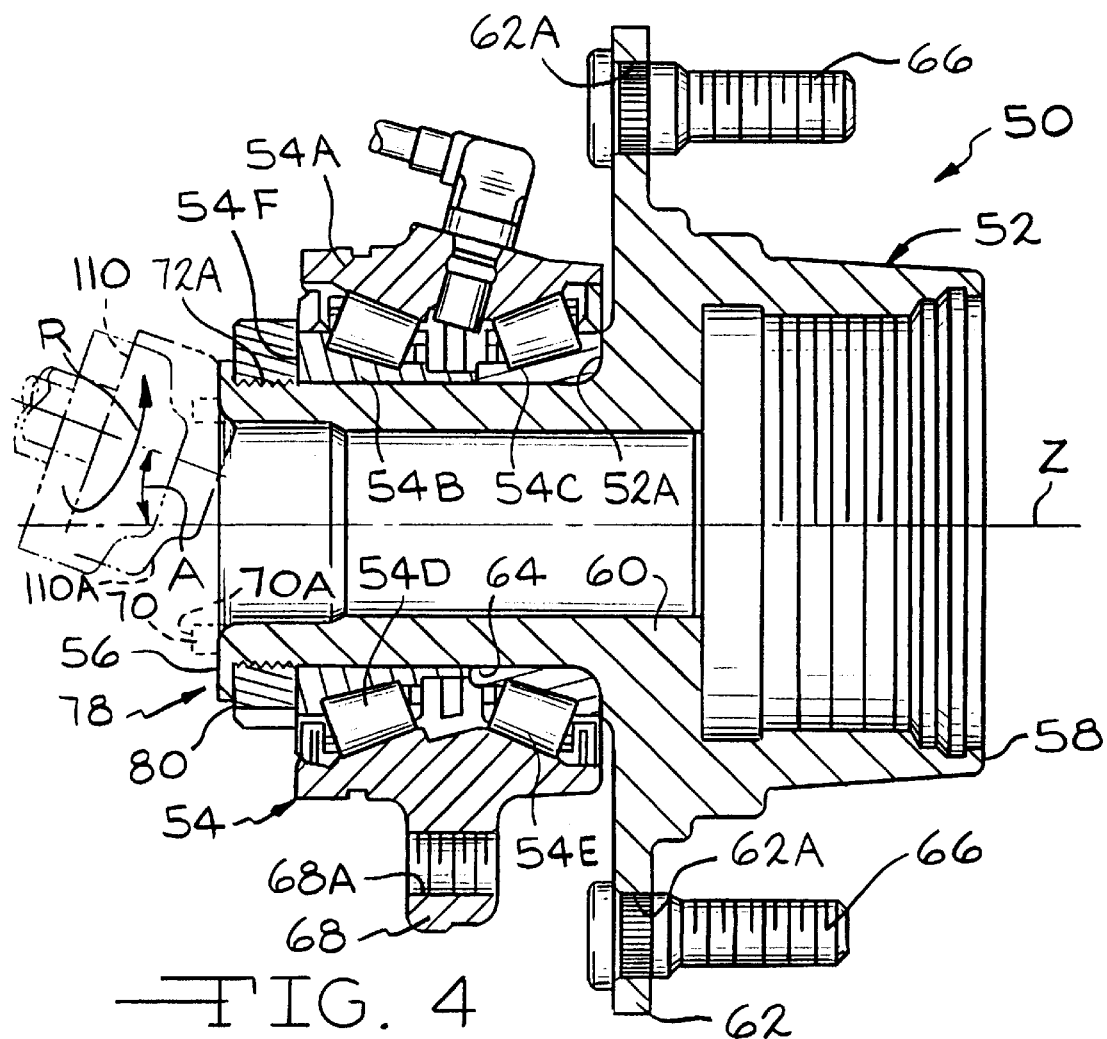
FIG. 4 is a sectional view of a portion of a first embodiment of an improved vehicle wheel hub and bearing retention system constructed in accordance with this invention.

Referring now to FIGS. 4 through 7, there is illustrated a first embodiment of an improved vehicle wheel hub and bearing retention system, indicated generally at 50, in accordance with this invention. The illustrated vehicle wheel hub and bearing retention system 50 is associated with a wheel (not shown) of a vehicle. The general structure and operation of the vehicle wheel hub and bearing retention system 50 is conventional in the art. Thus, only those portions of the vehicle wheel hub and bearing retention system 50 which are necessary for a full understanding of this invention will be explained and illustrated in detail. Also, although this invention will be described and illustrated in connection with the particular vehicle wheel hub and bearing retention system 50 disclosed herein, it will be appreciated that this invention may be used in connection with other vehicle wheel hubs and/or bearing assemblies.

The illustrated vehicle wheel hub and bearing retention system 50 includes a wheel hub 52 and a bearing unit 54. The wheel hub 52 defines a longitudinal axis Z and includes a generally stepped body having an opened inboard end 56, an opened outboard end 58, and a generally axially extending main body 60.

The main body 60 of the wheel hub 52 is provided with a radially outwardly extending flange 62 and a bearing seat 64 for receiving the bearing unit 54. The flange 62 of the wheel hub 52 includes a plurality of circumferentially spaced lug bolt receiving holes 62A formed therein (only two of such lug bolt receiving holes 62A are illustrated in FIG. 4). A lug bolt 66 is disposed in each of the lug bolt receiving holes 62A to secure a brake rotor (not shown) and a vehicle wheel (not shown) to the wheel hub 52 for rotation therewith. The opened outboard end 58 of the wheel hub 52 is adapted to receive a dust cover (not shown) to prevent dirt, mud, water, and other debris from entering into the interior of the wheel hub 52 through the opened outboard end 58.

Figure 5:
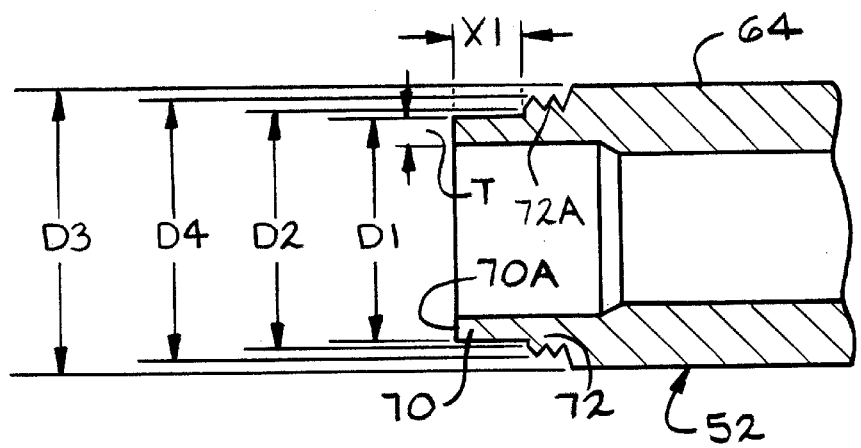
FIG. 5 is a sectional view of a portion of the wheel hub shown in FIG. 4 illustrating the structure of the opened inboard end of the wheel hub prior to subjecting the opened inboard end to a metal forming process in accordance with this invention.

As shown in FIG. 5, the wheel hub 52 is initially provided with a reduced diameter non-threaded section 70 directly adjacent the opened inboard end 56 thereof. The wheel hub section 70 has a generally constant thickness T, defines a predetermined outer diameter D1, and extends a predetermined axial distance X1. The wheel hub 52 is further provided with a section 72 directly adjacent the section 70. The section 72 of the wheel hub 52 is provided with external threads 72A. Also, the structure of the non-threaded wheel hub section 70 can be other than illustrated if desired.

The illustrated bearing unit 54 is a pregreased, sealed-for life non-serviceable cartridge style bearing pack assembly and is pressed onto the bearing seat 64 of the wheel hub 52. The bearing unit 54 includes an outer race 54A, a pair of inner races 54B and 54C, and a plurality of bearings 54D and 54E, shown in this embodiment as tapered roller bearings, installed between the inner races 54B and 54C and the outer race 54A. However, the bearing unit 54 can be other than illustrated if desired.

The outer race 54A of the bearing unit 54 includes an radially outwardly extending flange 68 having a plurality of circumferentially spaced mounting bolt receiving holes 68A formed therein (only one of such mounting bolt receiving holes 68A is illustrated in FIG. 4). A mounting bolt (not shown) is disposed in each of the mounting bolt receiving holes 68A to secure the bearing unit 54 to a non-rotatable component of the vehicle, such as the steering knuckle (not shown), so as to rotatably support the wheel hub 52 relative thereto.

Figure 7:
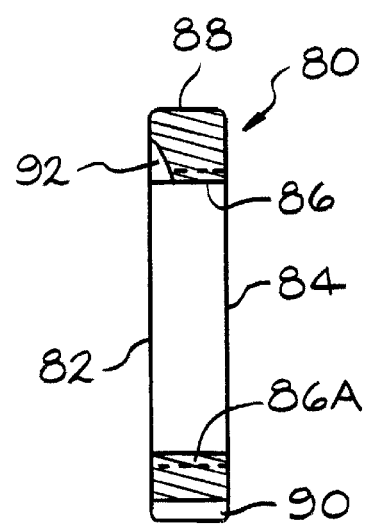
FIG. 7 is a sectional view of the bearing unit retention and preload device taken along line 7—7 of FIG. 6.

A bearing unit retention and preload device, indicated generally at 78, is installed on the wheel hub 52 adjacent the inboard end 56 thereof to secure and preload the bearing unit 54 on the wheel hub 52. In the illustrated embodiment, the bearing unit retention and preload device 78 includes a generally annular retention nut 80. As shown in FIG. 7, the retention nut 80 includes an inner end wall 82, an outer end wall 84, an inner cylindrical side wall 86, and an outer cylindrical side wall 88. The outer end wall 84 of the retention nut 80 defines an engagement surface which is oriented generally perpendicular to the longitudinal axis Z of wheel hub 52. The engagement surface 84 of the retention nut 80 is adapted to engage an inboard end surface 54F of the bearing unit 54 when the retention nut 80 is installed and tightened on the wheel hub 52, as will be described below. The retention nut 80 is preferably formed from stainless steel or carbon steel, and may be electroplated with zinc for corrosion protection. However, the retention nut 80 can be formed from other materials, such as for example, aluminum.

In the illustrated embodiment, the retention nut 80 is provided with a plurality of slots 90 (four slots 90 being illustrated in FIG. 6) formed in the outer cylindrical side wall 88. The slots 90 extend from the inner end wall 82 to the outer end wall 84 of the retention nut 80 and are adapted to allow a conventional tool to be used to install and tighten the retention nut 80 on the wheel hub 52. To accomplish this, the inner cylindrical side wall 86 of the retention nut 80 is provided with internal threads 86A. The internal threads 86A of the retention nut 80 mate with the external threads 72A provided on the section 70 of the wheel hub 52. As is known, the retention nut 80 is tightened against the inboard end surface 54F of the bearing unit 54 to a predetermined torque in order to exert a predetermined clamp load on the bearing unit 54.

Figure 6:
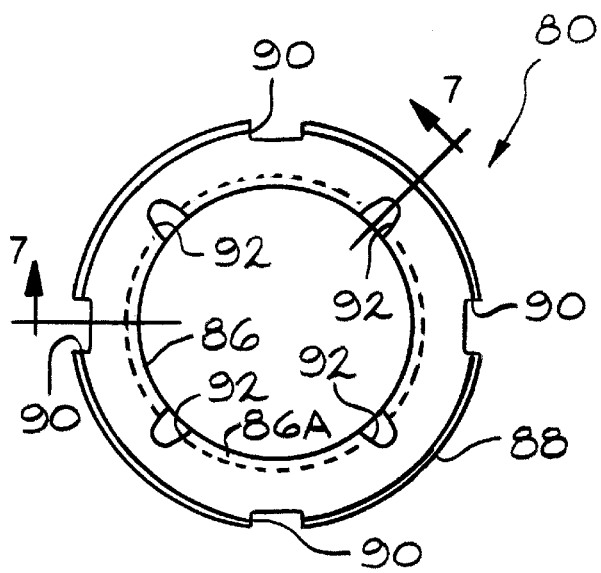
FIG. 6 is an elevational view of the bearing unit retention and preload device shown in FIG. 4.

In the illustrated embodiment, the retention nut 80 preferably further includes a plurality of indentations or notches 92 (four equidistantly spaced indentations 92 being illustrated in FIG. 6) provided therein. As shown in FIG. 7, the indentations 92 extend radially outwardly from the inner cylindrical side wall 86, and axially inwardly from the inner end wall 82 toward the outer end wall 84. Alternatively, the number, spacing, and/or the configuration of the indentations 92 can be other than illustrated if desired. As will be discussed, the indentations 92 are adapted to allow the material of the wheel hub 52 to be displaced therein in order to positively lock the retention nut 80 in place on the wheel hub 52.

Figures 8, 13:
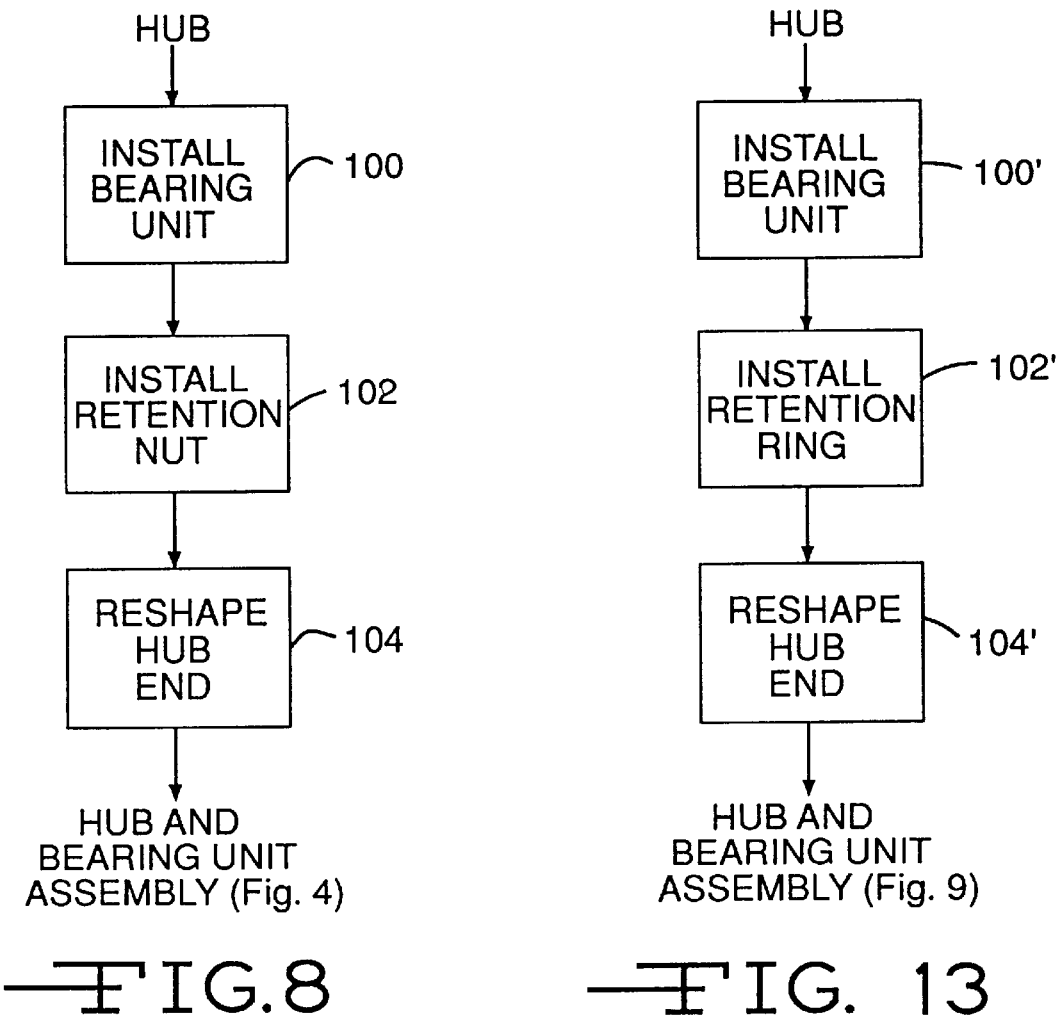
FIG. 8 is a block diagram showing a sequence of steps for producing the improved vehicle wheel hub and bearing retention system shown in FIG. 4.
FIG. 13 is a block diagram showing a sequence of steps for producing the improved vehicle wheel hub and bearing retention system shown in FIG. 9.
Figure 9:
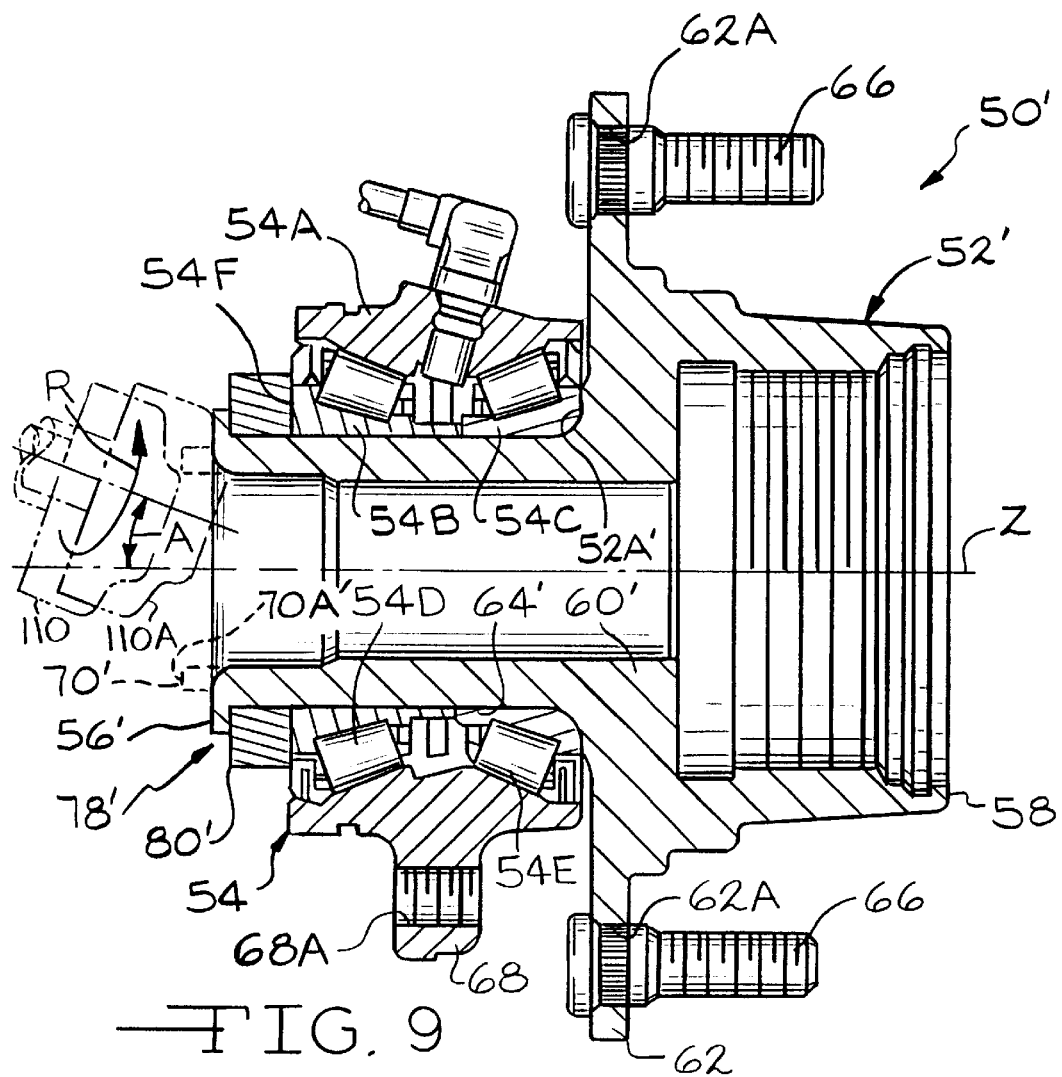
FIG. 9 is a sectional view of a portion of a second embodiment of an improved vehicle wheel hub and bearing retention system constructed in accordance with this invention.
Figure 10:
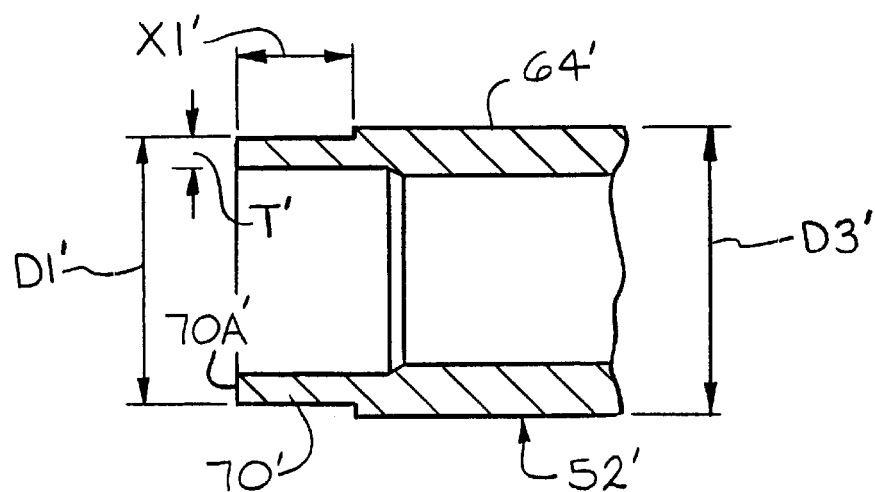
FIG. 10 is a sectional view of a portion of the wheel hub shown in FIG. 9 illustrating the structure of the opened inboard end of the wheel hub prior to subjecting the opened inboard end to a metal forming process in accordance with this invention.

Turning now to FIG. 8, the method for producing the vehicle wheel hub and bearing retention system 50 of this invention will be discussed. Initially, in step 100, the bearing unit 54 is pressed onto the bearing surface 64 of the wheel hub 52 and advanced (to the right in FIG. 4) until the inner race 54C engages a wheel hub shoulder 52A. Next, in step 102, the retention nut 80 is installed on the non-threaded section 70 of the opened inboard end of the wheel hub 52 (the shape of the section 70 of the inboard end of the wheel hub 52 being shown in FIG. 5 when the retention nut 80 is initially installed during step 102). During step 102, the retention nut 80 is advanced (to the right in FIG. 4) to the threaded section 72A and is threadably tightened thereon to exert a predetermined clamp load on the bearing unit 54 as described above. Following this, in step 104, the section 70 of the opened inboard end of the wheel hub 52 (shown in phantom in FIG. 4 prior to performing step 104), is subjected to a metal forming process to secure the retention nut 80 thereon and produce the vehicle wheel hub and bearing retention system 50 of this invention.

To accomplish this, the wheel hub 52 is supported on a suitable fixture not shown) and a metal forming tool 110 (shown in phantom in FIG. 4) is provided. The metal forming tool 110 is oriented at an angle A relative to the axis Z of the wheel hub 52 and is mounted on a support member (not shown) which allows the metal forming tool 110 to be selectively movable toward (and away from) the wheel hub 52. As will be discussed, the metal forming tool 110 is provided with a tool end 110A having a predetermined contour which is effective to impart a predetermined contour to the section 70 of the wheel hub 52 during step 104.

During the metal forming process of step 104, an end 70A of section 70 of the wheel hub 52 is engaged by the tool end 110A of the metal forming tool 110. As the forming tool 110 is orbited or moved (as shown by arrow R), the material of the section 70 of the wheel hub 52 is engaged and reshaped generally radially outwardly by the tool end 100A against the adjacent inner end wall 82 of the retention nut 80 to produce the final shape of the opened inboard end 56 of the wheel hub 52 shown in FIG. 4. During step 104, the forming tool 110 is operative to increase the radial dimension of the section 70 of the wheel hub 52 to form a predetermined finished section 56 of the wheel hub 52 which generally corresponds to the shape of the tool end 110A. As a result, the metal forming process of step 104 secures the retention nut 80 on the wheel hub 52. Also, during the metal forming process of step 104, the material of the section 70 of the wheel hub 52 is displaced into and fills the indentations 90 of the retention nut 80, thereby providing a positive mechanical lock of the retention nut 80 on the wheel hub 52. Alternatively, other metal forming processes can be used if desired.

Turning now to FIGS. 9–13 and using like reference numbers to indicate corresponding parts, a second embodiment of an improved vehicle wheel hub and bearing retention system, indicated generally at 50', and method for producing the same in accordance with this invention will be discussed.

The vehicle wheel hub and bearing retention system 50' includes a bearing unit retention and preload device, indicated generally at 78', installed on the wheel hub 52' to secure and preload the bearing unit 54 thereon. In the illustrated embodiment, the bearing unit retention and preload device 78' includes a generally annular retention ring 80'.

Figure 12:
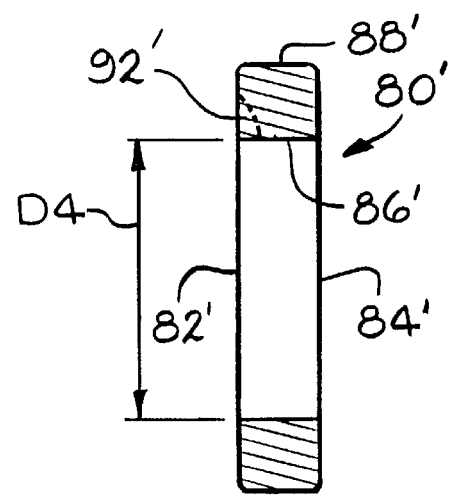
FIG. 12 is a sectional view of the bearing unit retention and preload device taken along line 12—12 of FIG. 11.

As shown in FIG. 12, the retention ring 80' includes an inner end wall 82', an outer end wall 84', an inner cylindrical side wall 86', and an outer cylindrical side wall 88'. The outer end wall 84' of the retention ring 80' defines an engagement surface which is oriented generally perpendicular to the longitudinal axis Z of wheel hub 52'. The engagement surface 84' of the retention ring 80' is adapted to engage an inboard end surface 54F of the bearing unit 54 when the retention ring 80' is installed and tightened on the wheel hub 52', as will be described below. The inner cylindrical side wall 86' of the retention ring 80' defines a retention ring inner diameter D4. The retention ring 80' is preferably formed from a material which is harder than material of the inner race 54B of the bearing unit 54. Also, the retention ring 80' is preferably formed from stainless steel or carbon steel, and may be electroplated with zinc for corrosion protection. However, the retention ring 80' can be formed from other materials, such as for example, aluminum.

Figure 11:
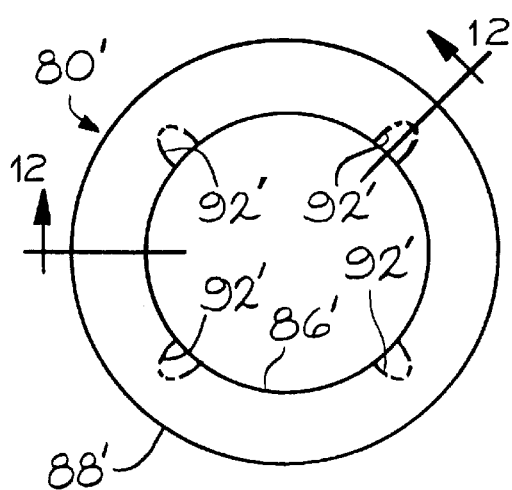
FIG. 11 is an elevational view of the bearing unit retention and preload device shown in FIG. 9.

In the illustrated embodiment, the retention ring 80' can be provided with a plurality of indentations 92' (four equidistantly spaced indentations 92' being illustrated in FIG. 11 in phantom) provided therein. As shown in FIG. 12, the indentations 92' extend radially outwardly from the inner cylindrical side wall 86', and axially inwardly from the inner end wall 82' toward the outer end wall 84'. Alternatively, the retention ring 80' does not have to include the indentations 92', or the number, spacing, and/or the configuration of the indentations 92' can be other than illustrated if desired. As will be discussed, the indentations 92' are adapted to allow the material of the wheel hub 52' to be displaced therein in order to positively lock the retention ring 80' in place on the wheel hub 52'.

Turning now to FIG. 13, the method for producing the vehicle wheel hub and bearing retention system 50' of this invention will be discussed. Initially, in step 100', the bearing unit 54 is pressed onto the bearing surface 64' of the wheel hub 52' and advanced thereon (to the right in FIG. 9) until the inner race 54C engages a wheel hub shoulder 52A'. Next, in step 102', the retention ring 80' is installed on the non-threaded section 70' of the opened inboard end of the wheel hub 52' (the shape of the section 70' of the inboard end of the wheel hub 52' being shown in FIG. 10 when retention ring 80' is initially installed during step 102'). Preferably, to accomplish this, the retention ring inner diameter D4 is slightly greater than the outer diameter D1' of the section 70' of the wheel hub 52' so as to provide a slip-fit or clearance-fit of the retention ring 80' thereon. Alternatively, the retention ring inner diameter D4 can be slightly less than or generally equal to the outer diameter D1' of the wheel hub 52' so as to provide a press-fit thereon.

Next, in step 104', the section 70' of the opened inboard end of the wheel hub 52' (shown in phantom in FIG. 9 prior to performing step 104'), is subjected to a metal forming process to secure the retention ring 80' thereon and to simultaneously preload the bearing unit 54' and thereby produce the vehicle wheel hub and bearing retention system 50' of this invention.

To accomplish this, the wheel hub 52' is supported on a suitable fixture (not shown) and a metal forming tool 110 (shown in phantom in FIG. 9) is provided. The metal forming tool 110 is oriented at an angle A relative to the axis Z of the wheel hub 52' and is mounted on a support member (not shown) which allows the metal forming tool 110 to be selectively movable toward (and away from) the wheel hub 52'. As will be discussed, the metal forming tool 110 is provided with a tool end 110A having a predetermined contour which is effective to impart a predetermined contour to the section 70' of the wheel hub 52 during step 104'.

During the metal forming process of step 104', an end 70A' of section 70' of the wheel hub 52' is engaged by the tool end 110A of the metal forming tool 110. As the forming tool 110 is orbited (as shown by arrow R), the material of the section 70' of the wheel hub 52' is engaged and reshaped generally radially outwardly by the tool end 100A against the adjacent inner end wall 82' of the retention ring 80' to produce the final shape of the opened inboard end 56' of the wheel hub 52' shown in FIG. 9. During step 104', the forming tool 110 is operative to increase the radial dimension of the section 70' of the wheel hub 52' and to form a predetermined finished section 56' of the wheel hub 52' which generally corresponds to the shape of the tool end 110A. As a result, the metal forming process of step 104' secures the retention ring 80' on the wheel hub 52'. Also, in this embodiment, during step 104', the metal forming process is selectively controlled so that the retention ring 80' is operative to exert a predetermined clamp load on the bearing unit 54. Thus, step 104' is operative to secure the retention ring 80' on the wheel hub 52' and to simultaneously preload the bearing unit 54. In addition, during the metal forming process of step 104', the material of the section 70' of the wheel hub 52' is displaced into and fills the indentations 90' of the retention ring 80' thereby providing a positive mechanical lock of the retention ring 80' on the wheel hub 52'. Alternatively, other metal forming processes can be used if desired.

One advantage of this invention is that the metal forming process is operative to positively secure the bearing unit retention and preload device 78 and 78' on the respective wheel hub 52 and 52' in a predetermined installed position and prevent axial and radial movement of the device relative thereto. As a result, the bearing unit retention and preload device 78 and 78' of this invention is operative to maintain the predetermined clamp load against the associated bearing unit 54. Another advantage of this invention is that since the bearing unit 54 is preferably a non-serviceable bearing unit, the metal forming process of the section 70 and 70' of the respective wheel hub 52 and 52' against the bearing unit retention and bearing preload device 78 and 78' produces a tamper-proof wheel hub and bearing retention assembly 50 and 50'.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A method for producing a vehicle wheel hub and bearing retention system comprising the steps of:
   (a) providing a wheel hub including an inboard end, an outboard end, and a main body, the wheel hub defining a bearing seat and a wheel hub shoulder, the inboard end of the wheel hub having a reduced diameter non-threaded outermost end directly adjacent thereto, the reduced diameter non-threaded outermost end defining an inboard end outer diameter, the main body of the wheel hub defining a main body outer diameter which is greater than the inboard end outer diameter, the bearing seat of the wheel hub defining a generally constant bearing seat outer diameter which is the generally the same as the main body outer diameter;
   (b) providing a bearing unit onto the bearing seat of the wheel hub adjacent the wheel hub shoulder;
   (c) providing a bearing unit retention and preload device on the inboard end of the wheel hub adjacent the bearing unit; and
   (d) re-shaping the material of reduced diameter non-threaded outermost end of the inboard end of the wheel hub against the bearing unit retention and preload device to thereby secure the bearing unit retention and preload device on the wheel hub and prevent axial movement of the bearing unit relative to the wheel hub.

2. The method defined in claim 1 wherein the main body of the wheel hub directly adjacent the reduced diameter non-threaded inboard end thereof is provided with external threads along a portion thereof, the bearing unit retention and preload device is a retention nut provided with internal threads, and prior to step (d) the step of threadably tightening the retention nut on the wheel hub against the bearing unit so as to exert a predetermined clamp load on the bearing unit.

3. The method defined in claim 1 wherein the bearing unit retention and preload device is a retention ring and step (d) further includes reshaping the material of the reduced diameter non-threaded outermost end of the inboard end of the wheel hub against the bearing ring so as to exert a predetermined clamp load on the bearing unit.

4. The method defined in claim 3 wherein the retention ring defines a retention ring inner diameter which is slightly greater than the outer diameter of the reduced diameter inboard end so as to provide a slip-fit thereon during step (c).

5. The method defined in claim 3 wherein the retention ring defines a retention ring inner diameter which is generally the same as the outer diameter of the reduced diameter inboard end so as to provide an press-fit thereon during step (c).

6. The method defined in claim 1 wherein the bearing unit retention and preload device includes at least one indention formed in an inner end wall thereof, and step (d) further includes reshaping the material of the reduced diameter inboard end of the wheel hub so as to be displaced into and fill the indentation thereby providing a positive mechanical lock of the bearing unit retention and preload device on the wheel hub.

7. The method defined in claim 1 wherein step (d) includes providing a metal forming machine having a tool end, the tool end oriented at an angle relative to a longitudinal axis of the wheel hub, and the tool end having a predetermined contour which is effective to impart a predetermined contour to the reduced diameter inboard end of the wheel hub during step (d).

8. The method defined in claim 1 wherein step (d) includes re-shaping the material of the reduced diameter inboard end of the wheel hub generally radially outwardly against the bearing unit retention and preload device.

9. A vehicle wheel hub and bearing retention system comprising:
   a wheel hub including an inboard end, an outboard end, and a main body, said wheel hub defining a bearing seat and a wheel hub shoulder, said inboard end of said wheel hub having a reduced diameter non-threaded outermost end, said reduced diameter non-threaded outermost end defining an inboard end outer diameter, said main body of said wheel hub defining a main body outer diameter which is greater than said inboard end outer diameter, said bearing seat of said wheel hub defining a generally constant bearing seat outer diameter which is the generally the same as said main body outer diameter;
   a bearing unit disposed onto said bearing seat of said wheel hub;
   a bearing unit retention and preload device installed on said inboard end of said wheel hub; and
   said reduced diameter non-threaded outermost end of said wheel hub extending against said bearing unit retention and preload device thereby securing said bearing unit retention and preload device on said wheel hub and preventing axial and radial movement of said bearing unit retention and preload device relative to said wheel hub.

10. The vehicle wheel hub and bearing retention system defined in claim 9 wherein said wheel hub includes an externally threaded section adjacent said inboard end, and said bearing unit retention and preload device is a retention nut installed on said externally threaded section of said wheel hub.

11. The vehicle wheel hub and bearing retention system defined in claim 10 wherein said retention nut includes at least one indentation formed in an end wall thereof, said indentation being filled by material of said inboard end of said wheel hub so as to provide a mechanical lock of said retention nut on said wheel hub.

12. The vehicle wheel hub and bearing retention system defined in claim 9 wherein said inboard end of said wheel hub is an opened inboard end.

13. The vehicle wheel hub and bearing retention system defined in claim 9 wherein said reduced diameter non-threaded outermost end defines a first outer diameter, said wheel hub further includes a non-threaded section adjacent said non-threaded outermost end which defines a second outer diameter which is greater than said first outer diameter, and said bearing unit retention and preload device is a retention nut installed on said first outer diameter.

14. The vehicle wheel hub and bearing retention system defined in claim 13 wherein said bearing seat defines a bearing seat outer diameter which is generally the same the second outer diameter.

15. The vehicle wheel hub and bearing retention system defined in claim 13 wherein said retention ring includes at least one indentation formed in an end wall thereof, said indentation being filled by material of said inboard end of said wheel hub so as to provide a mechanical lock of said retention ring on said wheel hub.

16. The vehicle wheel hub and bearing retention system defined in claim 13 wherein said retention ring defines a retention ring inner diameter which is slightly greater than said first outer diameter so as to provide a slip-fit thereon.

17. The vehicle wheel hub and bearing retention system defined in claim 13 wherein said retention ring defines a retention ring inner diameter which is generally the same as said first outer diameter so as to provide an press-fit thereon.

* * * * *